(12) United States Patent
Imaoka (10) Patent No.: US 8,553,983 B2
(45) Date of Patent: Oct. 8, 2013

(54) PERSONAL AUTHENTICATION SYSTEM AND PERSONAL AUTHENTICATION METHOD

(75) Inventor: Hitoshi Imaoka, Tokyo (JP)

(73) Assignee: NEC Corporation, Tokyo (JP)

( * ) Notice: Subject to any disclaimer, the term of this patent is extended or adjusted under 35 U.S.C. 154(b) by 256 days.

(21) Appl. No.: 13/003,270

(22) PCT Filed: Jul. 6, 2009

(86) PCT No.: PCT/JP2009/062290
§ 371 (c)(1),
(2), (4) Date: Feb. 11, 2011

(87) PCT Pub. No.: WO2010/004958
PCT Pub. Date: Jan. 14, 2010

(65) Prior Publication Data
US 2011/0135167 A1    Jun. 9, 2011

(30) Foreign Application Priority Data

Jul. 10, 2008  (JP) .................................. 2008-180577

(51) Int. Cl.
G06K 9/46      (2006.01)
G06K 9/66      (2006.01)
G06K 9/00      (2006.01)
G06K 9/62      (2006.01)

(52) U.S. Cl.
USPC ............................ 382/190; 382/118; 382/224

(58) Field of Classification Search
None
See application file for complete search history.

(56) References Cited

U.S. PATENT DOCUMENTS 5,842,194 A * 11/1998 Arbuckle ...................... 706/52
2003/0172284 A1    9/2003 Kittler (Continued)

FOREIGN PATENT DOCUMENTS

JP   2001-052168 A   2/2001
JP   2001-184509 A   7/2001

(Continued)

OTHER PUBLICATIONS

W. Zhao, et al., "Subspace Linear Discriminant Analysis for Face Recognition", Technical Report CAR-TR-914, Computer Vision Laboratory, Center for Automation Research, University of Maryland, Apr. 1999, pp. 1-24.

(Continued)

*Primary Examiner* — Matthew Bella
*Assistant Examiner* — Thomas Conway
(74) *Attorney, Agent, or Firm* — Sughrue Mion, PLLC (57) ABSTRACT

A personal authentication system according to the present invention includes a matrix generation unit, a feature extraction unit, a feature transformation unit, a processing unit, and a data matching unit. The matrix generation unit classifies a plurality of feature amounts of face image data, which are recorded in advance, into classes and calculates as a mapping matrix, coefficients of a linear discriminant equation which uses the recorded plurality of feature amounts as variables. The feature extraction unit extracts a first feature amount from first face image data and extracts a second feature amount from second face image data. The feature transformation unit, by using the mapping matrix, transforms the first feature amount into a first transformed feature amount and transforms the second feature amount into a second transformed feature amount. The processing unit calculates as a similarity, a normalized correlation value between the first transformed feature amount and the second transformed feature amount. The data matching unit judges that the first face image data and the second face image data are image data of same person when the similarity exceeds a predetermined threshold.

11 Claims, 4 Drawing Sheets

(56) References Cited

U.S. PATENT DOCUMENTS

| | | | |
|---|---|---|---|
| 2005/0201595 A1* | 9/2005 | Kamei | 382/118 |
| 2007/0127787 A1* | 6/2007 | Castleman et al. | 382/118 |
| 2007/0275313 A1 | 11/2007 | Miyashita | |
| 2008/0130962 A1* | 6/2008 | Lee et al. | 382/118 |
| 2009/0087036 A1* | 4/2009 | Imaoka | 382/118 |

FOREIGN PATENT DOCUMENTS

| | | |
|---|---|---|
| JP | 2003-534613 A | 11/2003 |
| JP | 2004-192250 A | 7/2004 |
| JP | 2004-192603 A | 7/2004 |
| JP | 2006-338092 A | 12/2006 |
| JP | 2007-128262 A | 5/2007 |
| JP | 2007-156944 A | 6/2007 |
| JP | 2007-316809 A | 12/2007 |
| JP | 2007-317960 A | 12/2007 |
| WO | WO 2006129551 A1 * | 12/2006 |

OTHER PUBLICATIONS

Hart Duda, et al., "Pattern Recognition," Shin Gijyutsu Communication, pp. 111-117.

* cited by examiner

PERSONAL AUTHENTICATION SYSTEM AND PERSONAL AUTHENTICATION METHOD

CROSS REFERENCE TO RELATED APPLICATIONS

This application is a National Stage of International Application No. PCT/JP2009/062290 filed Jul. 6, 2009, claiming priority based on Japanese Patent Application No. 2008-180577 filed Jul. 10, 2008, the contents of all of which are incorporated herein by reference in their entirety.

TECHNICAL FIELD

The present invention relates to a personal authentication system, a personal authentication method and a personal authentication program, which authenticate a person through the use of an image authentication. It should be noted that this application is based upon and claims the benefit of priority from Japanese Patent Application No. 2008-180577, the disclosure of Japanese Patent Application No. 2008-180577 is incorporated herein its entirely by reference.

BACKGROUND ART

As a method of extracting features to identify a person from a face image, there is a method in which an attention is directed to personal differences of shapes and arrangements of parts of a face, such as eyes, a nose, a mouth and the like, and features are extracted from them to be used in recognition. However, it is difficult to extract the parts of the face from the face image at a good precision. Even if the respective parts are successfully extracted, it is not easy to use the difference between the similar shapes in the recognition.

"Pattern recognition" written by Duda, Hart, and Stork (translation supervised by Onoe) discloses as a method extracting features to identify a person from a face image, a method using a principal component analysis and a method of using a discriminant analysis (refer to a non patent literature 1).

The principal component analysis is a typical multivariate analysis method that describes features of variances of a plurality of pieces of data by using the smallest possible number of indices (principal components) under the small loss of information. In the principal component analysis, information with regard to classes to which respective data belong is not used, and targets to be outputted are not determined in advance. For this reason, the principal component analysis is not always a preferred method as the method of extracting effective features to identify a person.

On the other hand, in the discriminant analysis, learning data are classified in advance, a distance of data between classes is determined based on information with regard to classes to which respective data belong. For example, learning is carried out such that a distance of data of the same class is reduced and a distance of data of different classes is extended. In the discriminant analysis, a normal distribution of input data is assumed. Thus, when input data have a distribution other than the normal distribution, a sufficient identification performance cannot be obtained.

In addition, personal authentication apparatus, in which an authentication error is reduced by the improvement of a precision in authenticating a person based on a face image, is described in Japanese Patent Publication (JP-P 2004-192250A) (refer to a patent literature 1), Japanese Patent Publication (JP-P 2007-128262A) (refer to a patent literature 2) and Japanese Patent Publication (JP-P 2007-156944A) (refer to a patent literature 3).

Japanese Patent Publication (JP-P 2001-184509A) proposes a pattern recognition method that handles an image itself as a pattern (refer to a patent literature 4). In the recognition of image data by using the pattern recognition method, without using knowledge peculiar to a face, the pattern recognition of the image data is carried out through learning similar to the discriminant analysis. However, when face image data is used, a distance suitable for identification is different from class to class. For this reason, when face image data of an unknown class is inputted, a high recognition precision cannot be obtained by this method.

CITATION LIST

Patent Literature

Patent literature 1: Japanese Patent Publication (JP-P 2004-192250A)
Patent literature 2: Japanese Patent Publication (JP-P 2007-128262A)
Patent literature 3: Japanese Patent Publication (JP-P 2007-156944A)
Patent literature 4: Japanese Patent Publication (JP-P 2001-184509A)

Non Patent Literature

Non patent literature 1: Written by Duda, Hart, and Stork, translation supervised by Onoe, Pattern recognition, Shin Gijyutsu Communication P111, P117

SUMMARY OF INVENTION

Therefore, an object of the present invention is to provide a personal authentication system, method and program, having a high identification precision.

In a first aspect of the present invention, a personal authentication system is provided. The personal authentication system according to the present invention contains a matrix generation unit, a feature extraction unit, a feature transformation unit, a processing unit and a data matching unit. The matrix generation unit classifies a plurality of feature amounts of face image data, which are recorded in advance, into classes and calculates as a mapping matrix, coefficients of a linear discriminant equation which uses the recorded plurality of feature amounts as variables. The feature extraction unit extracts a first feature amount from first face image data and extracts a second feature amount from second face image data. The feature transformation unit, by using the mapping matrix, transforms the first feature amount into a first transformed feature amount and transforms the second feature amount into a second transformed feature amount. The processing unit calculates as a similarity, a normalized correlation value between the first transformed feature amount and the second transformed feature amount. When the similarity exceeds a predetermined threshold, the data matching unit judges that the first face image data and the second face image data are image data of same person.

In a second aspect of the present invention, a personal authentication method is provided. The personal authentication method according to the present invention contains: a step of classifying a plurality of feature amounts of face image data, which are recorded in advance, into classes; a step of calculating as a mapping matrix, coefficients of a linear discriminant equation which uses the recorded plurality of feature amounts as variables; a step of extracting a first feature amount from first face image data; a step of extracting a second feature amount from second face image data; a step of transforming the first feature amount into a first transformed feature amount by using the mapping matrix; a step of transforming the second feature amount into a second transformed feature amount by using the mapping matrix; a step of calculating as a similarity, a normalized correlation value between the first transformed feature amount and the second transformed feature amount; and a step of judging that the first face image data and the second face image data are image data of same person when the similarity exceeds a predetermined threshold.

In a third aspect of the present invention, a personal authentication program is provided. The personal authentication program according to the present invention causes a computer to execute a personal authentication method that includes: a step of classifying a plurality of feature amounts of face image data, which are recorded in advance, into classes; a step of calculating as a mapping matrix, coefficients of a linear discriminant equation which uses the recorded plurality of feature amounts as variables; a step of extracting a first feature amount from first face image data; a step of extracting a second feature amount from second face image data; a step of transforming the first feature amount into a first transformed feature amount by using the mapping matrix; a step of transforming the second feature amount into a second transformed feature amount by using the mapping matrix; a step of calculating as a similarity, a normalized correlation value between the first transformed feature amount and the second transformed feature amount; and a step of judging that the first face image data and the second face image data are image data of same person when the similarity exceeds a predetermined threshold.

The step of calculating the mapping matrix is preferred to contain: a step of calculating a first normalized correlation value between a first average vector of feature amounts belonging to a first class and a first feature amount belonging to the first class; a step of calculating a second normalized correlation value between a second average vector of feature amounts in a second class and the first feature amount; and a step of updating the mapping matrix by using a steepest descent method such that a variation of a loss with respect to the mapping matrix approaches zero, wherein the loss is based on the first normalized correlation value and the second normalized correlation value. Here, the second normalized correlation value is a maximum value of normalized correlation values between the first feature amount and average vectors of feature amounts in respective classes other than the first class. The step of transforming is preferred to include a step of transforming a feature amount extracted in the step of extracting into a transformed feature amount by using the updated mapping matrix.

Also, the step of calculating the mapping matrix is preferred to contain a step of performing an update of the mapping matrix with respect to all of the recorded feature amounts. Then, the step of performing the update of the mapping matrix with respect to all of the recorded feature amounts is preferred to be repeated for a predetermined number of times.

Moreover, it is preferred that when the first normalized correlation value is represented by $d_k$, the second normalized correlation value is represented by $d_l$, the first average vector is represented by $m_k$, the second average vector is represented by $m_l$, the mapping matrix is represented by A and the loss is represented by E, the variation is represented by $$\frac{\partial E}{\partial A} = -\gamma A \left\{ (xv^T + vx^T) - f_k \frac{m_k m_k^T}{(Am_k, Am_k)} + f_l \frac{m_l m_l^T}{(Am_l, Am_l)} - (f_k - f_l) \frac{xx^T}{(Ax, Ax)} \right\}.$$ (Formula 1)

Here, it is provided that:

$$f_k = (1 - d_k)^{y-1} d_k;$$ (Formula 2)

$$f_l = (|d_l|)^y;$$ (Formula 3)

and $$v = \frac{f_k m_k}{(Am_x, Ax)} - \frac{f_l m_l}{(Am_l, Ax)}.$$ (Formula 4)

Moreover, the step of calculating the mapping matrix is preferred to include a step of updating the mapping matrix such that the variation approaches zero.

Moreover, it is preferred that when the first transformed feature amount is represented by $y_P$, the second transformed feature amount is represented by $y_Q$ and a transposition of the vector is represented by T, the similarity d is represented by $$d = (y_P^T y_Q) / \sqrt{(y_P^T y_P)(y_Q^T y_Q)}$$ (Formula 5).

Moreover, it is preferred that the plurality of feature amounts of face image data, which are recorded in advance, are feature amounts which are extracted from a plurality of pieces of face image data by using a same algorism as the step of extracting.

From the above description, the personal authentication system according to the present invention can have a high identification performance.

BRIEF DESCRIPTION OF DRAWINGS

The above objects, advantages, and features of the invention will be more apparent from description of embodiments in conjunction with the accompanying drawings in which.

DESCRIPTION OF EMBODIMENTS

A personal authentication system, a personal authentication method and a personal authentication program, according to an embodiment of the present invention, will be described below with reference to the attached drawings.

Figure 1:
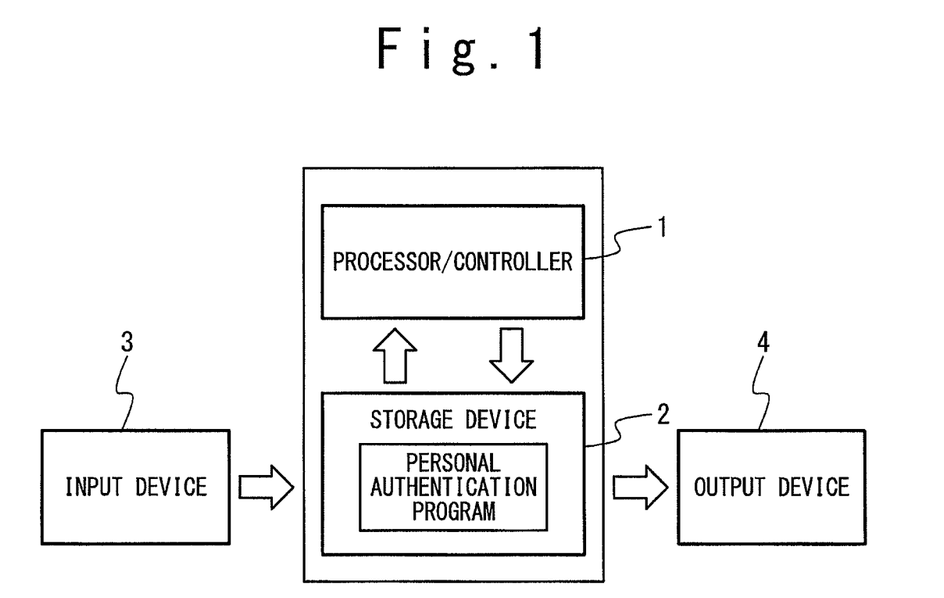
FIG. 1 is a system configuration diagram according to an embodiment of the present invention.

With reference to FIG. 1, the personal authentication system according to the present embodiment contains a processor/controller 1 (for example, processor), a storage device 2 (for example, memory, hard disc) which stores the personal authentication program; an input device 3 (for example, camera, scanner) and an output device 4 (for example, display and the like). The personal authentication system is preferred to be implemented by, for example, a computer system.

Figure 2:
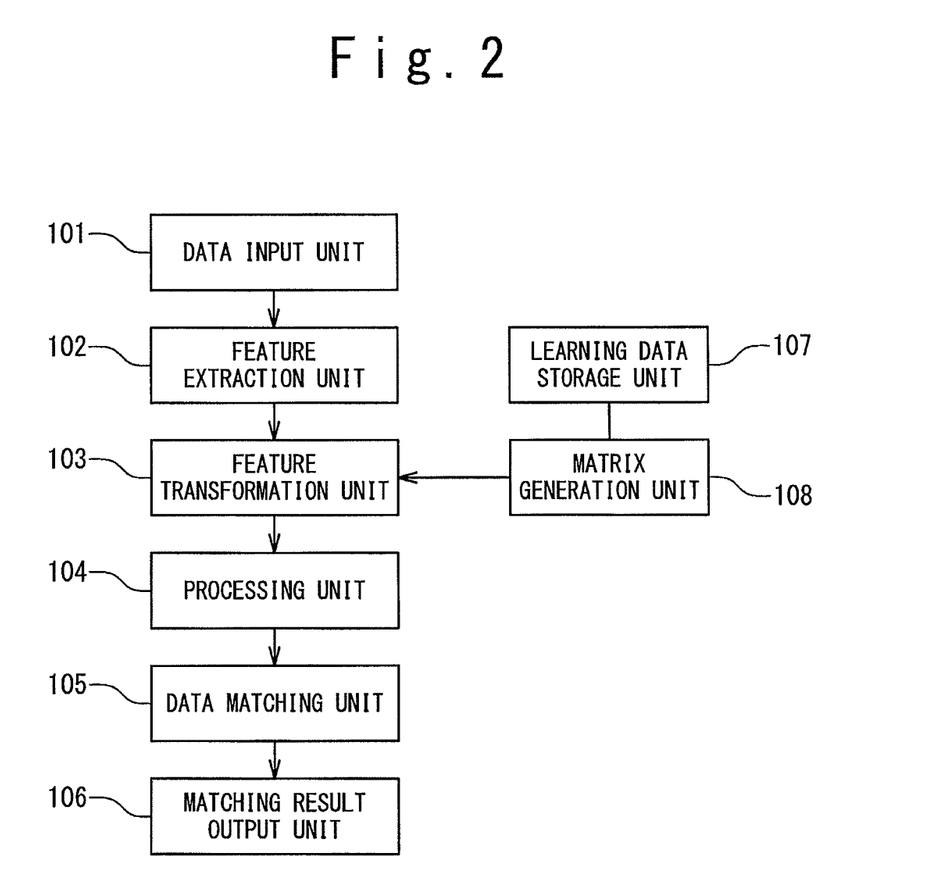
FIG. 2 is a block diagram showing a personal authentication system according to the embodiment of the present invention.

With reference to FIG. 2, the personal authentication system according to the present embodiment contains functional blocks including a data input unit 101, a feature extraction unit 102, a feature transformation unit 103, an processing unit 104, a data matching unit 105, a matching result output unit 106, a learning data storage unit 107 and a matrix generation unit 108. The processor/controller is preferred to execute the personal authentication program to implement those functional blocks.

Figure 3:
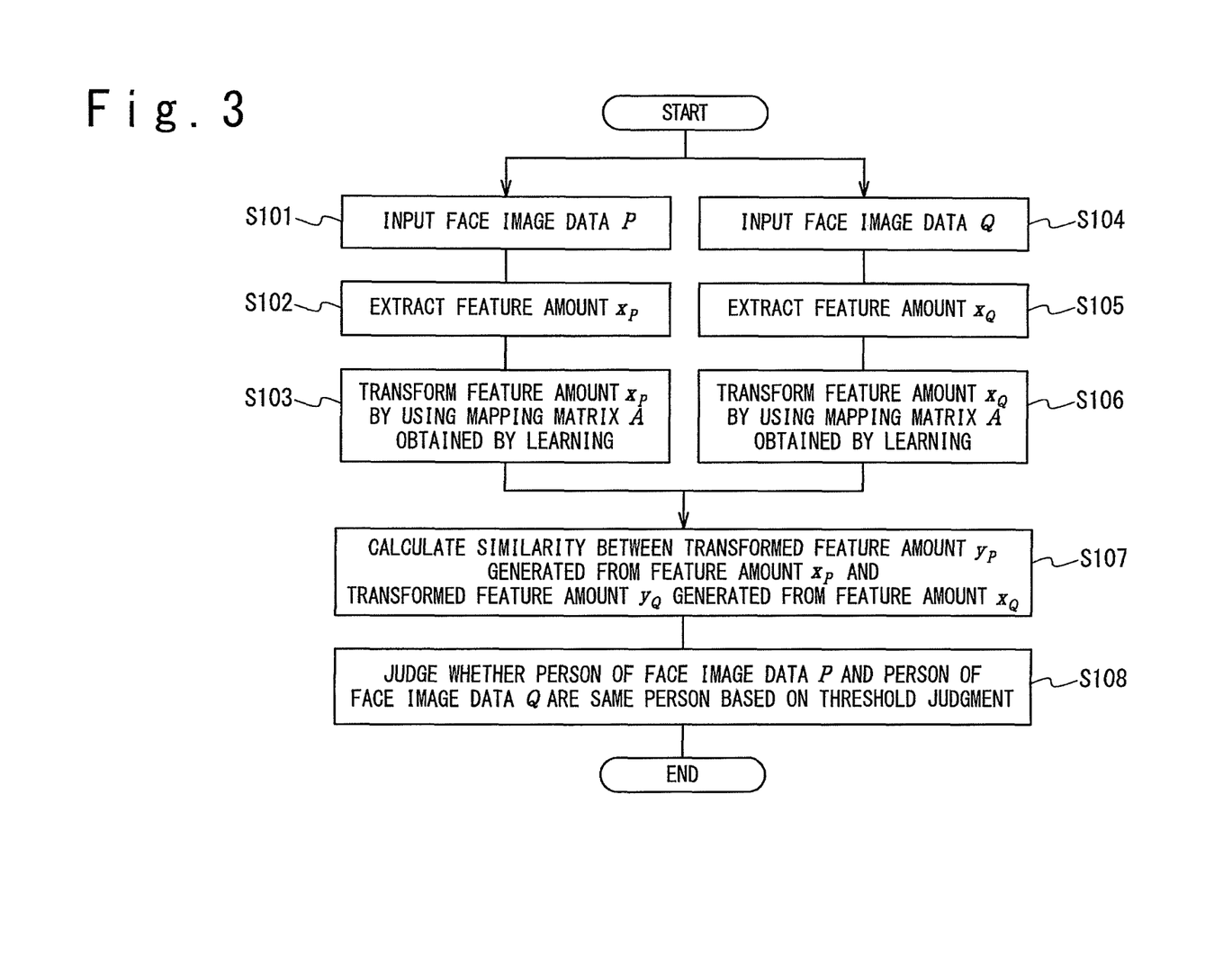
FIG. 3 is a flowchart showing an operation procedure of matching.

With reference to FIG. 3, details of the data input unit 101, the feature extraction unit 102, the feature transformation unit 103, the processing unit 104, the data matching unit 105, the matching result output unit 106, the learning data storage unit 107 and the matrix generation unit 108 will be described below.

The data input unit 101 is exemplified as a digital camera or a scanner and obtains face image data P and Q. For example, face image data taken by a digital camera or the like are obtained as the face image data P and Q. Or, scanned images of face photographs are obtained as the face image data P and Q. The face image data P and Q are inputted to the feature extraction unit of the personal authentication system. (Step S101, Step S104). Here, the face image data P and Q are inputted to the personal authentication system at arbitrary timings, respectively.

The feature extraction unit 102 uses a conventional face detection technique to extract feature amounts of face regions from the inputted face image data P and Q (Steps S102, S105). In detail, the feature extraction unit 102 carries out pre-processing of the face image data P and Q, such as normalization, edge extraction and difference detection based on the average value of all features, and extracts a first feature amount $x_P$ and a second feature amount $x_Q$ from the first face image P and the second face image Q, respectively.

The feature transformation unit 103 transforms, as shown by formulas (1) and (2), the first feature amount $x_P$ into a first transformed feature amount $y_P$ and transforms the second feature amount $x_Q$ into a second transformed feature amount $y_Q$, respectively, by using a mapping matrix A obtained by learning (Step S103, Step S106). A learning mechanism of the mapping matrix A will be described later.

$$y_P = Ax_P \quad (1)$$

$$y_Q = Ax_Q \quad (2)$$

The processing unit 104 uses a formula (3) to calculate a normalized correlation d (cross correlation) between the first transformed feature amount $y_P$ and the second transformed feature amount $y_Q$ as a similarity d (S107).

$$d = (y_P^T y_Q)/\sqrt{(y_P^T y_P)(y_Q^T y_Q)} \quad (3)$$

Here, a superscript T means a transposition of a vector.

When the similarity d is equal to or larger than a predetermined threshold, the data matching unit 105 judges that a person of the first face image data P and a person of the second face image data Q are same person (Step S108). At this time, when the similarity d is smaller than the predetermined threshold, the person of the first face image data P and the person of the second face image data Q may be judged to be different persons.

The matching result output unit 106 outputs the judgment result by the data matching unit 105 to the output device 4. The output device 105 visually outputs the judgment result. Or, the judgment result by the data matching unit 105 may be outputted to a device for controlling open and close of a gate, which is not shown. In this case, the device controls open and close of the gate based on the judgment result.

The process of the steps S101 to S103 and the process of the steps S104 to S106 are preferred to be carried out at arbitrary timings, respectively. For example, when a person (referred to as a first person) goes through the gate, the first face image data P of the first person is obtained by the data input unit 101, and the first transformed feature amount $y_P$ is generated by the process of the steps S101 to S103. Next, at the different timing, when a person (referred to as a second person) goes through the gate, the second face image data Q of the second person is obtained by the data input unit 101, and the second transformed feature amount $y_Q$ is generated by the process of the steps S104 to S106. When the first transformed feature amount $y_P$ and the second transformed feature amount $y_Q$ are generated, personal authentication processes of the steps S107 and S108 are executed automatically or in response to a manual operation.

Next, a learning method of the mapping matrix A will be described. The mapping matrix A is a coefficient matrix which linearly maps X into Y. Prior to personal authentication processes of the steps S101 to S108, the coefficient matrix A is generated by the learning described later and recorded in the storage device 2.

Figure 4:
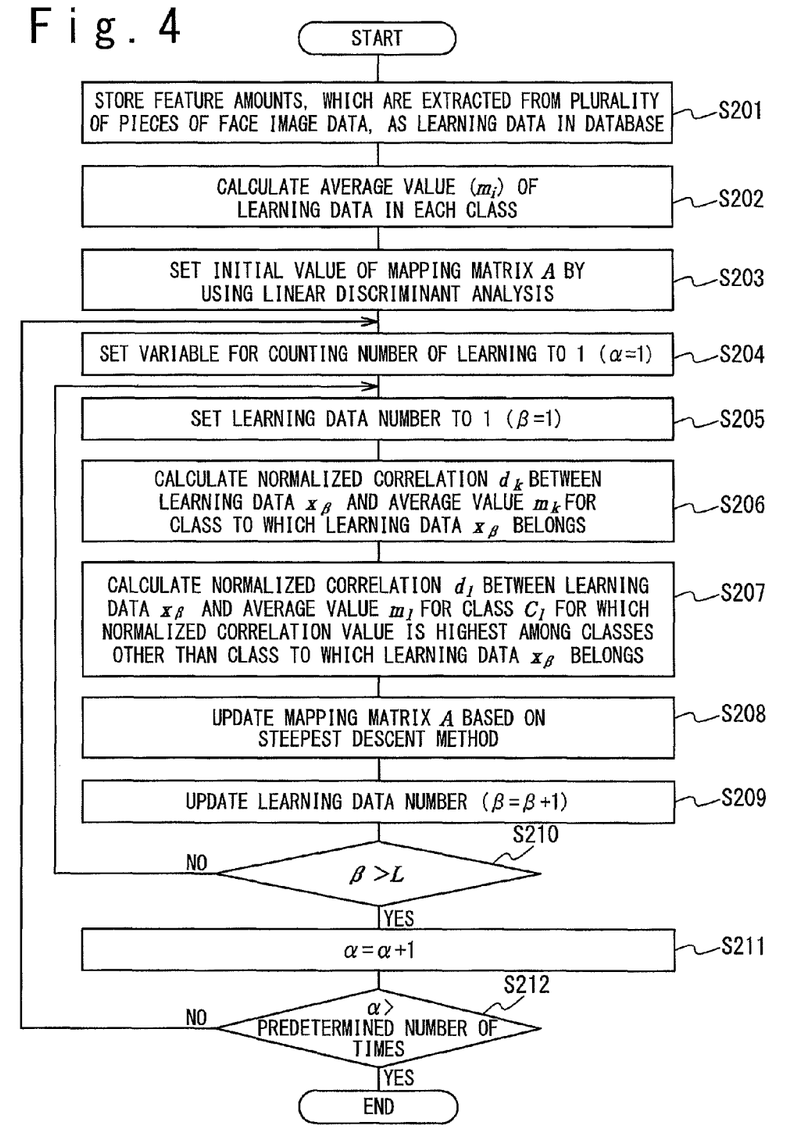
FIG. 4 is a flowchart showing an operation procedure of learning.

Referring to FIG. 4, details of operations of the learning data storage unit 107 and the matrix generation unit 108 will be described. FIG. 4 is a flowchart showing the learning method of the mapping matrix A.

The learning data storage unit 107 stores plurality of feature amounts respectively extracted from a plurality of pieces of face image data, as a plurality of pieces of learning data (Step S201). Here, the learning data stored in the learning data storage unit 107 are feature amounts extracted from the face image data obtained in advance by using the same algorism as the feature extraction unit 102.

The learning data stored in the learning data storage unit 107 are classified into classes with respect to features. The learning data storage unit 107 stores L pieces of learning data. Hereafter, the learning data is represented by $x_\beta$ ($\beta=1, 2, \ldots, L$). It should be noted that each stored data ($x_\beta$) is preferred to be a multidimensional vector. Also, N of classes classified with respect to features are represented by $C_1, C_2, \ldots, C_N$. As indicated by a formula (4), Li pieces of learning data belong to the i-th class $C_i$. Here, $u_{ij}$ indicates a number of the learning data belonging to the class $C_i$. Here, the number Li pieces of the learning data belonging to the class is one at least and L at maximum (Li is equal to or larger than one and equal to or smaller than L). It is provided that each of the learning data belongs to one of the classes.

$$C_i = \{u_{i1}, u_{i2}, \ldots, u_{ij}, \ldots, u_{iLi}\} \quad (4)$$

The matrix generation unit 108 calculates an average vector of the learning data in each class (Step S202). Here, it is provided that the learning data belonging to the class $C_i$ is represented by $x_i$, and the average vector of all of the learning data belonging to the class $C_i$ is represented by $m_i$. Then, the average vector of the learning data in each class is represented by a formula (5).

$$m_i = \frac{1}{L_i} \sum_{j \in C_i} x_j \quad (5)$$

Next, the matrix generation unit 108 uses a linear discriminant analysis to obtain an initial value of the mapping matrix A (Step S203). Here, a multi-class discriminant analysis in which each person corresponds to one class is carried out. The method of the multi-class discriminant analysis is described in detail in the non patent literature 1, for example.

The matrix generation unit 108 updates the mapping matrix A by repeating the leaning process of steps S204 to S211 described below for a predetermined number of times. At first, the matrix generation unit 108 initializes a variable α for counting the number of learning, to one and starts an updating process of the mapping matrix A (Step S204). At this time, a number β of the learning data $x_β$ serving as a learning target is initialized to one (Step S205). That is, at the beginning, the updating process of the mapping matrix A is carried out with using learning data $x_1$ as a learning target. Hereafter, the learning process is described with the leaning data serving as a learning target being represented as x.

When the class to which the learning data x as a learning target belongs is represented by $C_k$, the matrix generation unit 108 calculates a normalized correlation $d_k$ between the learning data x and an average vector $m_k$ of all of the learning data belonging to the same class $C_k$ based on a formula (6) (Step S206). At the beginning, since the first learning data $x_1$ is used as a learning target, there is calculated the normalized correlation $d_k$ between the learning data $x_1$ and the average vector $m_k$ of the learning data in the class to which the learning data belongs.

$$d_k = (Ax)^T(Am_k)\sqrt{(Ax)^T(Ax)(Am_k)^T(Am_k)} \qquad (6)$$

Also, the matrix generation unit 108 selects a class for which a normalized correlation value between learning data as the learning target and an average vector of a class other than the class to which the learning data as the learning target belongs is maximum, and obtains the maximum normalized correlation value (Step S207). In detail, the matrix generation unit 108 calculates normalized correlation values ($d_1$ to $d_{k-1}$, $d_{k+1}$ to $d_N$) between the learning data x and average vectors ($m_1$ to $m_{k-1}$, $m_{k+1}$ to $m_N$) of the learning data belonging to the respective classes ($C_1$ to $C_{k-1}$, $C_{k+1}$ to $C_N$) other than the class $C_k$ to which the learning data x belongs. Then, the matrix generation unit 108 selects the maximum normalized correlation value from the calculated normalized correlation values ($d_1$ to $d_{k-1}$ $d_{k+1}$ to $d_N$) (Step S207). For example, as the maximum normalized correlation value, a normalized correlation value $d_l$ between the learning data x and an average value $m_l$ of the learning data belonging to the class $C_l$ is selected. In this case, the normalized correlation value $d_l$ is represented by a formula (7).

$$d_l = (Ax)^T(Am_l)\sqrt{(Ax)^T(Ax)(Am_l)^T(Am_l)} \qquad (7)$$

The matrix generation unit 108 carries out the learning such that the normalized correlation value $d_k$ approaches one and the normalized correlation value $d_l$ approaches zero. In detail, when a loss E for the learning data x is defined by a formula (8), the matrix generation unit 108 updates the mapping matrix A by using a steepest descent method such that the loss E is reduced (Step S208). That is, in a formula (9), the mapping matrix A is updated such that a variation of the loss E with respect to the mapping matrix A approaches zero. Here, ε is a constant larger than zero. Also, a derivative of the loss E with respect to A is represented by a formula (10). Here, $f_k$, $f_l$ and v are represented by formulas (11) to (13), and γ is a positive constant.

$$E = (1 - d_k)^y + |d_l|^y \qquad (8)$$

$$A \leftarrow A - \varepsilon \frac{\partial E}{\partial A} \qquad (9)$$

$$\frac{\partial E}{\partial A} = -\gamma A \left\{ (xv^T + vx^T) - f_k \frac{m_k m_k^T}{(Am_k, Am_k)} + f_l \frac{m_l m_l^T}{(Am_l, Am_l)} - (f_k - f_l) \frac{xx^T}{(Ax, Ax)} \right\} \qquad (10)$$

$$f_k = (1 - d_k)^{y-1} d_k \qquad (11)$$

$$f_l = (|d_l|)^y \qquad (12)$$

$$v = \frac{f_k m_k}{(Am_x, Ax)} - \frac{f_l m_l}{(Am_l, Ax)} \qquad (13)$$

The matrix generation unit 108 performs the above update with respect to all of the learning data which are recorded in advance (Step S209, Step S210). In detail, the number β of the learning data as the learning target is counted up by one and the update is performed, and the next learning data is set as the learning target. At this time, the process of the steps S205 to S209 are executed until the β reaches L. Consequently, the mapping matrix A is updated by using all of the recorded learning data as the learning target.

When the updating processes of the mapping matrix A that are performed with respect to all of the learning data are assumed to be a single learning process, the matrix generation unit 108 repeats the learning process for a predetermined number of times (Steps S211, S212). In detail, when the number β of the learning data, which is counted up at the step S209, exceeds the number L of the learning data (Yes in Step S210), the matrix generation unit 108 counts up the variable a for counting the number of learning by one. Then, when the learning number (α) exceeds the predetermined number of times, the matrix generation unit 108 terminates the updating of the mapping matrix A. When the learning number (α) is equal to or less than the predetermined number of times, the procedure proceeds to the step S204 to repeat the learning process (Steps S211, S212).

As mentioned above, the matrix generation unit 108 updates and sets the mapping matrix A such that the loss is reduced. The loss is based on the normalized correlation value between the learning data as the feature amount classified into the class and the average vector in the same class; and the normalized correlation value between the learning data and the average vector in the other class. In other words, the mapping matrix A is set such that a separation degree of the normalized correlation values is increased. Here, the mapping matrix A is generated such that the normalized correlation value with regard to the feature amount of high similarity approaches one and the normalized correlation value with regard to the feature amount of low similarity approaches zero. For this reason, in a case that a normalized correlation between transformed feature amounts obtained by transforming feature amounts (image data) with the use of the matrix A is used as a similarity, the similarity is a value close to one when the feature amounts (image data) are similar and the similarity is a value close to zero when the feature amounts are not similar. Thus, by setting the threshold to be an intermediate value between one and zero in the threshold judgment process of the step S108, a high identification performance can be obtained.

Only by calculating a normalized correlation between the extracted feature amount of the first face image data P and the extracted feature amount of the second face image data Q as a similarity, it is difficult to obtain a high recognition precision. On the other hand, the personal authentication system of the present invention transforms the extracted feature amounts through the use of the mapping matrix A generated by using the feature amounts which are classified in advance and judges the similarity based on the normalized correlation value between the transformed feature amounts. Consequently, according to the personal authentication system of the present invention, the reliability of the similarity is improved even for face images (feature amounts) of which classes are unknown and the precision of a similarity judgment (for example, a person judgment) is improved.

When the same face is photographed in different conditions, a feature amount extracted from face image data of the face is varied in accordance with the condition. For example, there is a case that intensity vectors of respective pixels of a face image are extracted as a feature amount. Since a value of intensity vector of face image is proportional to a brightness of background, intensities of the respective pixels vary in accordance with variation of intensity of illumination.

When the feature amount is varied in this way, there is a case that a distance between the features (a length of a feature vector) is largely varied. For this reason, as in a conventional technique, in a method for carrying out personal authentication by using a distance between features as an identification scale, there is a case that the variation of the feature amount reduces the authentication precision. On the other hand, in the personal authentication system according to the present invention, the normalized correlation for which the length of the feature vector is normalized is used as a scale of similarity judgment. In general, the variation of an original value (here, the feature amount), from which a normalized correlation value is obtained, has a little influence on the normalized correlation value. Therefore, the influence of the variation of the feature amount on the similarity judgment can be reduced. Hence, the precision of the similarity judgment by the personal authentication system according to the present invention is high as compared with the conventional method.

As mentioned above, embodiments of the present invention has been described. However, the specific configuration is not limited to the above-mentioned embodiments. Thus, embodiments having modifications without departing from the scope of the present invention are included in the present invention. The present invention is not limited to the personal authentication system for the personal authentication which has been described in the present embodiment but includes anything for similarity judgment. In this case, the invention can be applied to an apparatus that inputs, in place of the face image data for which similarity judgment (matching) is carried out, other image data (for example, data of image in which entire of an article or painting as a judgment target is photographed) to judge genuine or fake.

The invention claimed is:

1. A personal authentication system comprising:
a matrix generation unit configured to classify a plurality of feature amounts of face image data, which are recorded in advance, into classes and to calculate as a mapping matrix, coefficients of a linear discriminant equation which uses said recorded plurality of feature amounts as variables;
a feature extraction unit configured to extract a first feature amount from first face image data and to extract a second feature amount from second face image data;
a feature transformation unit configured to, by using said mapping matrix, transform said first feature amount into a first transformed feature amount and transform said second feature amount into a second transformed feature amount;
a processing unit configured to calculate as a similarity, a normalized correlation value between said first transformed feature amount and said second transformed feature amount; and
a data matching unit configured to judge that said first face image data and said second face image data are image data of same person when said similarity exceeds a predetermined threshold,
wherein said matrix generation unit calculates a first normalized correlation value between a first average vector of feature amounts belonging to a first class and a first feature amount belonging to said first class,
said matrix generation unit calculates a second normalized correlation value between a second average vector of feature amounts in a second class and said first feature amount,
said second normalized correlation value is a maximum value of normalized correlation values between said first feature amount and average vectors of feature amounts in respective classes other than said first class,
said matrix generation unit updates said mapping matrix by using a steepest descent method such that a variation of a loss with respect to said mapping matrix approaches zero,
said loss is based on said first normalized correlation value and said second normalized correlation value, and
said feature transformation unit transforms feature amounts extracted by said feature extraction unit into transformed feature amounts by using said updated mapping matrix.

2. The personal authentication system according to claim 1, wherein said matrix generation unit performs an update of said mapping matrix with respect to all of said recorded feature amounts and repeats said update of said mapping matrix with respect to all of said recorded feature amounts for a predetermined number of times.

3. The personal authentication system according to claim 1, wherein when said first normalized correlation value is represented by $d_k$, said second normalized correlation value is represented by $d_l$, said first average vector is represented by $m_k$, said second average vector is represented by $m_l$, said mapping matrix is represented by A and said loss is represented by E, said variation is represented by $$\frac{\partial E}{\partial A} = -\gamma A \left\{ (xv^T + vx^T) - f_k \frac{m_k m_k^T}{(Am_k, Am_k)} + f_l \frac{m_l m_l^T}{(Am_l, Am_l)} - (f_k - f_l) \frac{xx^T}{(Ax, Ax)} \right\}, \quad \text{(Formula 1)}$$

provided that:

$$f_k = (1 - d_k)^{y-1} d_k; \quad \text{(Formula 2)}$$

$$f_l = (|d_l|)^y; \quad \text{(Formula 3)}$$

and $$v = \frac{f_k m_k}{(Am_x, Ax)} - \frac{f_l m_l}{(Am_l, Ax)}, \quad \text{(Formula 4)}$$

and said matrix generation unit updates said mapping matrix such that said variation approaches zero.

4. The personal authentication system according to claim 1, wherein when said first transformed feature amount is represented by $y_p$, said second transformed feature amount is represented by $y_Q$ and a transposition of a vector is represented by T, said similarity d is represented by $$d=(y_P^T y_Q)/\sqrt{(y_P^T y_P)(y_Q^T y_Q)} \quad \text{(Formula 5)}.$$

5. The personal authentication system according to claim 1, wherein said plurality of feature amounts of face image data, which are recorded in advance, are feature amounts which are extracted from a plurality of pieces of face image data by using a same algorithm as said feature extraction unit.

6. A personal authentication method comprising:
classifying a plurality of feature amounts of face image data, which are recorded in advance, into classes;
calculating as a mapping matrix, coefficients of a linear discriminant equation which uses said recorded plurality of feature amounts as variables;
extracting a first feature amount from first face image data;
extracting a second feature amount from second face image data;
transforming said first feature amount into a first transformed feature amount by using said mapping matrix;
transforming said second feature amount into a second transformed feature amount by using said mapping matrix;
calculating as a similarity, a normalized correlation value between said first transformed feature amount and said second transformed feature amount; and
judging that said first face image data and said second face image data are image data of same person when said similarity exceeds a predetermined threshold,
wherein said calculating said mapping matrix includes:
calculating a first normalized correlation value between a first average vector of feature amounts belonging to a first class and a first feature amount belonging to said first class;
calculating a second normalized correlation value between a second average vector of feature amounts in a second class and said first feature amount, wherein said second normalized correlation value is a maximum value of normalized correlation values between said first feature amount and average vectors of feature amounts in respective classes other than said first class; and
updating said mapping matrix by using a steepest descent method such that a variation of a loss with respect to said mapping matrix approaches zero, wherein said loss is based on said first normalized correlation value and said second normalized correlation value, and
said transforming includes transforming a feature amount extracted in said extracting into a transformed feature amount by using said updated mapping matrix.

7. The personal authentication method according to claim 6, wherein said calculating said mapping matrix includes performing an update of said mapping matrix with respect to all of said recorded feature amounts, and
said performing said update of said mapping matrix with respect to all of said recorded feature amounts is repeated for a predetermined number of times.

8. The personal authentication method according to claim 6, wherein when said first normalized correlation value is represented by $d_k$, said second normalized correlation value is represented by $d_l$, said first average vector is represented by $m_k$, said second average vector is represented by $m_l$, said mapping matrix is represented by A and said loss is represented by E, said variation is represented by $$\frac{\partial E}{\partial A} = -\gamma A \left\{ (xv^T + vx^T) - f_k \frac{m_k m_k^T}{(Am_k, Am_k)} + f_l \frac{m_l m_l^T}{(Am_l, Am_l)} - (f_k - f_l) \frac{xx^T}{(Ax, Ax)} \right\}, \quad \text{(Formula 6)}$$

provided that:

$$f_k = (1 - d_k)^{y-1} d_k; \quad \text{(Formula 7)}$$

$$f_l = (|d_l|)^y; \quad \text{(Formula 8)}$$

and $$v = \frac{f_k m_k}{(Am_x, Ax)} - \frac{f_l m_l}{(Am_l, Ax)}, \quad \text{(Formula 9)}$$

and said calculating said mapping matrix includes updating said mapping matrix such that said variation approaches zero.

9. The personal authentication method according to claim 6, wherein when said first transformed feature amount is represented by $y_P$, said second transformed feature amount is represented by $y_Q$ and a transposition of a vector is represented by T, said similarity d is represented by $$d=(y_P^T y_Q)/\sqrt{(y_P^T y_P)(y_Q^T y_Q)} \quad \text{(Formula 10)}.$$

10. The personal authentication method according to claim 6, wherein said plurality of feature amounts of face image data, which are recorded in advance, are feature amounts which are extracted from a plurality of pieces of face image data by using a same algorithm as said extracting.

11. A computer-readable storage medium as a non-transitory tangible medium, storing a personal authentication program that causes a computer to execute a personal authentication method comprising:
classifying a plurality of feature amounts of face image data, which are recorded in advance, into classes;
calculating as a mapping matrix, coefficients of a linear discriminant equation which uses said recorded plurality of feature amounts as variables;
extracting a first feature amount from first face image data;
extracting a second feature amount from second face image data;
transforming said first feature amount into a first transformed feature amount by using said mapping matrix;
transforming said second feature amount into a second transformed feature amount by using said mapping matrix;
calculating as a similarity, a normalized correlation value between said first transformed feature amount and said second transformed feature amount; and
judging that said first face image data and said second face image data are image data of same person when said similarity exceeds a predetermined threshold,
wherein said calculating said mapping matrix includes:
calculating a first normalized correlation value between a first average vector of feature amounts belonging to a first class and a first feature amount belonging to said first class;
calculating a second normalized correlation value between a second average vector of feature amounts in a second class and said first feature amount, wherein said second normalized correlation value is a maximum value of normalized correlation values between said first feature amount and average vectors of feature amounts in respective classes other than said first class; and updating said mapping matrix by using a steepest descent method such that a variation of a loss with respect to said mapping matrix approaches zero, wherein said loss is based on said first normalized correlation value and said second normalized correlation value, and said transforming includes transforming a feature amount extracted in said extracting into a transformed feature amount by using said updated mapping matrix.

* * * * *